(12) United States Patent
Sheng et al.

(10) Patent No.: US 12,200,566 B2
(45) Date of Patent: Jan. 14, 2025

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventors: Bin Sheng, Jiangsu (CN); Pingping Xu, Jiangsu (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 579 days.

(21) Appl. No.: 17/611,922

(22) PCT Filed: May 18, 2020

(86) PCT No.: PCT/CN2020/090780
§ 371 (c)(1),
(2) Date: Nov. 17, 2021

(87) PCT Pub. No.: WO2020/238671
PCT Pub. Date: Dec. 3, 2020

(65) Prior Publication Data
US 2022/0264248 A1    Aug. 18, 2022

(30) Foreign Application Priority Data
May 24, 2019   (CN) .......................... 201910440421.9

(51) Int. Cl.
*H04W 4/02* (2018.01)
*H04L 5/00* (2006.01)
(Continued)

(52) U.S. Cl.
CPC ........... *H04W 4/023* (2013.01); *H04L 5/0051* (2013.01); *H04W 4/46* (2018.02); *H04W 40/20* (2013.01); *H04W 92/18* (2013.01)

(58) Field of Classification Search
CPC ........ H04W 4/023; H04W 4/46; H04L 5/0051
See application file for complete search history.

(56) References Cited

U.S. PATENT DOCUMENTS

| 2009/0163143 A1* | 6/2009 | De Rore ............... H04L 25/024 455/63.1 |
| 2011/0238306 A1* | 9/2011 | Miucic .................. G01S 5/0284 701/469 |

(Continued)

FOREIGN PATENT DOCUMENTS

CN    104869585 A    8/2015

OTHER PUBLICATIONS

International Search Report and Written Opinion mailed on Aug. 19, 2020, received for PCT Application PCT/CN2020/090780, Filed on May 18, 2020, 8 pages including English Translation.

(Continued)

*Primary Examiner* — Barry W Taylor
(74) *Attorney, Agent, or Firm* — XSENSUS LLP

(57) ABSTRACT

The present disclosure provides an electronic device and a method for wireless communication, and a computer readable storage medium. The electronic device comprises: a processing circuit configured to: determine, on the basis of the channel statistical characteristics of a sidelink channel between a first communication device and a second communication device in the Internet of Vehicles, whether a communication path between the first communication device and the second communication device is a direct view path or a non-direct view path; and if the communication path is a direct view path, use the information obtained by means of the direct view path for the coordinated positioning of the first communication device and the second communication device.

11 Claims, 14 Drawing Sheets

(51) Int. Cl.
*H04W 4/46* (2018.01)
*H04W 40/20* (2009.01)
*H04W 92/18* (2009.01)

(56) References Cited

U.S. PATENT DOCUMENTS

| | | | | |
|---|---|---|---|---|
| 2012/0057555 | A1* | 3/2012 | Zhang | H04B 7/0626 |
| | | | | 370/329 |
| 2014/0329520 | A1* | 11/2014 | Militano | G01S 5/0258 |
| | | | | 455/422.1 |
| 2015/0245311 | A1* | 8/2015 | Wang | G01S 5/14 |
| | | | | 455/456.1 |
| 2019/0394634 | A1* | 12/2019 | Akkarakaran | H04W 88/06 |
| 2020/0005566 | A1* | 1/2020 | Jain | G07C 9/28 |
| 2020/0007247 | A1* | 1/2020 | Gulati | H04B 17/373 |
| 2020/0028617 | A1* | 1/2020 | Landis | H04L 1/0003 |
| 2021/0266212 | A1* | 8/2021 | Chae | G01S 5/06 |

OTHER PUBLICATIONS

Huawei et al., "Power Saving Techniques", 3GPP TSG RAN WG1 Meeting #95, R1-1812231, Nov. 12-16, 2018, 8 pages.
Intel Corporation, "UE and gNB Measurements for NR Positioning", 3GPP TSG RAN WG1 Meeting #97, 3GPP TSG RAN WG1 Meeting #97, R1-1906823, May 13-17, 2019, pp. 1-14.

* cited by examiner

ELECTRONIC DEVICE AND METHOD FOR WIRELESS COMMUNICATION, AND COMPUTER READABLE STORAGE MEDIUM

CROSS-REFERENCE TO RELATED APPLICATIONS

This application is based on PCT filing PCT/CN2020/090780, filed May 18, 2020, which claims the priority to Chinese Patent Application No. 201910440421.9, titled "ELECTRONIC DEVICE AND METHOD FOR WIRELESS COMMUNICATION, AND COMPUTER READABLE STORAGE MEDIUM", filed on May 24, 2019 with the China National Intellectual Property Administration (CNIPA), the entire contents of each are incorporated herein by reference in its entirety.

FIELD

The present disclosure relates to the technical field of wireless communications, and in particular to positioning of devices in the Internet of Vehicles. More particularly, the present disclosure relates to an electronic apparatus and a method for wireless communications, and a computer-readable storage medium.

BACKGROUND

In a scenario of an Internet of Vehicles, location information is important data that needs to be shared among vehicles in time to avoid occurrence of accidents. For example, a vehicle may be located using cellular signals or satellite signals. Multi-path and blocking are negligible in an open environment such as in suburbs or on highways. In this case, regardless of using the cellular signals or the satellite signals, high accuracy in positioning can be acquired. However, when the vehicle is in a tunnel, underground garage, or other areas with serious multi-path and blocking, it is difficult to obtain sufficiently accurate location information, because the global positioning system (GPS) signal is weak and the cellular signals do not have a Line of sight (LOS, which means that a wireless signal propagates in a straight line between a transmitting terminal and a receiving terminal without being blocked) path. In view of this, it is desirable to provide a method for accurate location that is suitable for a scenario of the Internet of Vehicles.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry configured to: determine, based on a channel statistical characteristic of a sidelink channel between a first communication device and a second communication device in an Internet of Vehicles (IoV), whether a communication path between the first communication device and the second communication device is a Line of sight (LOS) path or a Not Line of sight (NLOS) path; and if the communication path is the LOS path, use information obtained through the LOS path in cooperative location for the first communication device and the second communication device.

According to an aspect of the present disclosure, a method for wireless communications is provided. The method includes: determining, based on a channel statistical characteristic of a sidelink channel between a first communication device and a second communication device in an Internet of Vehicles (IoV), whether a communication path between the first communication device and the second communication device is a Line of sight (LOS) path or a Not Line of sight (NLOS) path; and if the communication path is the LOS path, using information obtained through the LOS path in cooperative location for the first communication device and the second communication device.

According to another aspect of the present disclosure, an electronic apparatus for wireless communications is provided. The electronic apparatus includes processing circuitry configured to: acquire a reference value of a channel statistical characteristic of a sidelink channel at each position, the reference value being used to distinguish whether the corresponding sidelink channel is an LOS path or a NLOS path; and provide the reference value to a communication device in an Internet of Vehicles.

According to another aspect of the present disclosure, a method for wireless communications is provided. The method includes: acquiring a reference value of a channel statistical characteristic of a sidelink channel at each position, the reference value being used to distinguish whether the corresponding sidelink channel is an LOS path or a NLOS path; and providing the reference value to a communication device in an Internet of Vehicles.

According to other aspects of the present disclosure, there are further provided computer program codes and computer program products for implementing the methods for wireless communications above, and a computer readable storage medium having recorded thereon the computer program codes for implementing the methods for wireless communications described above.

The electronic apparatus according to the present disclosure distinguishes an LOS path and a NLOS path based on a channel statistical characteristic of a sidelink channel in an Internet of Vehicles, and uses information obtained through the LOS path for cooperative location, so as to accurately locate a communication device in various situations.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Currently, the cellular-based positioning technology supported by the fourth-generation mobile communication system includes, for example, Observed Time Difference of Arrival (OTDOA), Angle of Arrival plus Time Advance (AOA+TA), Uplink Time of Arrival (UTOA), and Assisted Global Positioning System (A-GPS). However, a vehicle cannot be accurately located by the above-mentioned technologies when the vehicle is in a multi-path and heavily shielded area, because there is no LOS path for a cellular signal and the GPS signal is weak.

In the Internet of Vehicles, sidelink is defined for communication between vehicles and communication between a Road Side Unit (RSU) and a vehicle. The sidelink may be used to not only transmit data, but also measure a relative distance between a transmitting terminal and a receiving terminal. In this embodiment, a technology of using a sidelink to locate communication devices in the Internet of Vehicles is provided. The communication devices in the Internet of Vehicles may include, for example, a vehicle or various on-vehicle communication devices (such as user equipment) or modules, RSUs, and the like.

Figure 1:
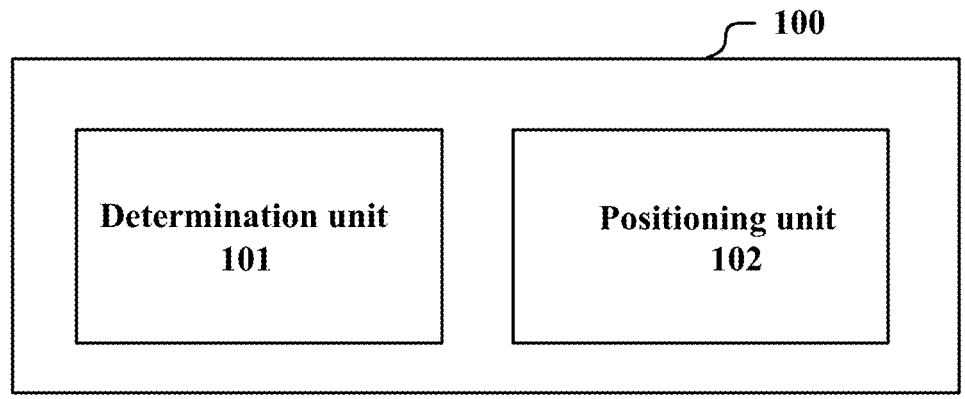
FIG. 1 is a block diagram showing functional modules of an electronic apparatus for wireless communications according to an embodiment of the present disclosure.

FIG. 1 shows a block diagram of functional modules of an electronic apparatus 100 for wireless communications according to an embodiment of the present disclosure. As shown in FIG. 1, the electronic apparatus 100 includes a determination unit 101 and a positioning unit 102. The determination unit 101 is configured to determine, based on a channel statistical characteristic of a sidelink channel between a first communication device and a second communication device in an IoV, whether a communication path between the first communication device and the second communication device is an LOS path or a NLOS (Not Line of sight) path. The positioning unit 102 is configured to use information obtained through the LOS path in cooperative location for the first communication device and the second communication device, if the communication path is the LOS path.

The determination unit 101 and the positioning unit 102 may be implemented by one or more processing circuitries, and the processing circuitry may be implemented as a chip or a processor, for example. Moreover, it should be understood that various functional units in the electronic apparatus shown in FIG. 1 are only logical modules divided based on their specific functions, and are not intended to limit a specific implementation. The same applies to the examples of other electronic apparatus to be described later.

The electronic apparatus 100 may be, for example, provided at a first communication device side, or may be communicatively connected to the first communication device. The first communication device may be a vehicle or an RSU. Similarly, the second communication device may also be a vehicle or an RSU.

Here, it should be further noted that the electronic apparatus 100 may be implemented in a chip level or an apparatus level. For example, the electronic apparatus 100 may serve as the first communication device itself, and may further include an external device such as a memory and a transceiver (not shown in FIG. 1). The memory may be configured to store programs and related data information required for the first communication device to implement various functions. The transceiver may include one or more communication interfaces to support communications with different apparatus (for example, a base station, another communication device and the like). The implementation of the transceiver is not limited herein. The same also applies to the following description of other configuration examples of the electronic apparatus on a communication device side.

The cellular wireless communication channel, in a broad sense, is a stable random channel without correlated scattering, while a sidelink channel in the Internet of Vehicles is highly time-variant and unstable, with correlated scattering. Therefore, the statistical characteristics of the sidelink channel vary with time and propagation environment. In particular, the channel statistical characteristic of the sidelink channel corresponding to the LOS path is different from that of the sidelink channel corresponding to the NLOS path. The channel statistical characteristic includes, for example, one or more of a Ricean K-factor, a Kurtosis factor and a space time frequency channel correlation function. It should be understood that examples of the channel statistical characteristic are not limited to the above, and any other statistical characteristics that can distinguish the LOS path from the NLOS path may be used.

In an example, the determination unit 101 is further configured to calculate the channel statistical characteristic based on a reference signal received at the first communication device from the second communication device. For example, the reference signal may include a pilot signal or a training sequence. The determination unit 101 performs channel estimation based on the reference signal, and calculates the channel statistical characteristic based on a result of the channel estimation. In this example, the first communication device operates as a receiving terminal, and the second communication device operates as a transmitting terminal.

Figure 2:
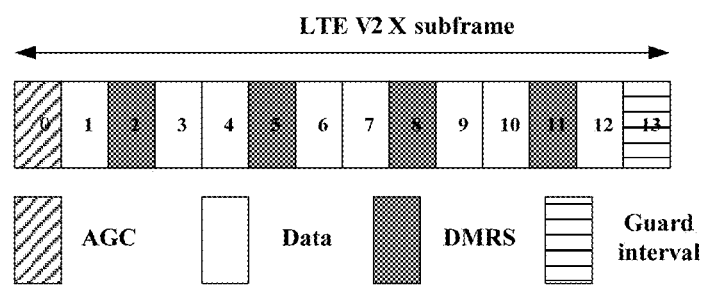
FIG. 2 shows a schematic diagram of a subframe structure in an LTE-V2X system.

In a case that the system operates based on the LTE-V2X standard, a subframe structure is shown in FIG. 2. There are 4 pilot signals (i.e., demodulation reference signals (DMRSs)) in each subframe. These pilot signals are known at the receiving terminal, and may be used for estimating a channel parameter. In addition, in order to improve accuracy of the channel estimation, the transmitting terminal may transmit a dedicated training sequence.

Moreover, the communication between the transmitting terminal and the receiving terminal is in a half-duplex mode. In an area covered by cellular signals, a vehicle may obtain information of physical resources allocated by the base station for sidelink communications. The base station first composes multiple vehicles into a cluster, and allocates a corresponding time-frequency resource block to each of the vehicles in the cluster. During communication, the vehicles in turn transmit information over the allocated resource block. When a vehicle is transmitting information, the other vehicles are in a receiving state and do not transmit information. However, the vehicle that transmits information may also receive information transmitted from other vehicles. Therefore, the information transmission between vehicles is bidirectional mutual transmission. Similarly, in an area not covered by cellular signals, vehicles may also form a cluster spontaneously, and a distributed scheduling scheme may be used. A resource block may be selected from a reserved resource pool for communication, and a distributed congestion control technology is applied to avoid conflict in selecting of transmission time. In this case, the information transmission between vehicles is also the above-mentioned bidirectional mutual transmission. Therefore, the transceiver in the electronic apparatus 100 may be configured to transmit the reference signal to the second communication device. That is, the first communication device may also operate as a transmitting terminal.

The calculation of the Ricean K-factor, which serves an example of the channel statistical characteristic, is described below. Assuming that a complex envelope value $\{r(n), n=0, 1, \ldots, N-1\}$ of N channel parameters is obtained by the channel estimation, the Ricean K-factor may be estimated based on the following equation:

$$K = \frac{-2\mu_2^2 + \mu_4 - \mu_2\sqrt{2\mu_2^2 - \mu_4}}{\mu_2^2 - \mu_4} \quad (1)$$

where $$\mu_m = \frac{1}{N}\sum_{0=n}^{N-1} r^m(n) \quad (2)$$

Figure 3:
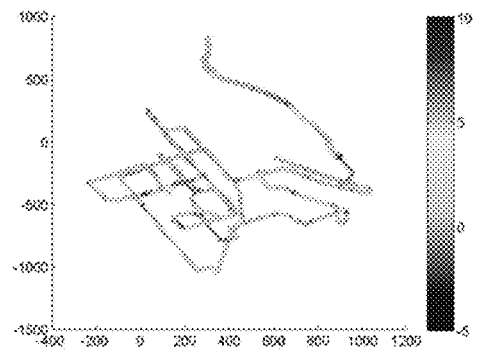
FIG. 3 shows an example of a measured results of Ricean K-factor.

Equation 2 represents an m-th moment of the complex envelope of the channel parameters. FIG. 3 shows measured results of the Ricean K-factor, in which the horizontal axis and vertical axis respectively represent a spatial position in units of meter. The Ricean K-factor is in units of dB. It can be seen that the Ricean K-factor assumes different values in different regions. In a case of a great value of the Ricean K-factor, it tends to determine that the communication path between the transmitting terminal and the receiving terminal is an LOS path. In a case of a small value of the Ricean K-factor, it tends to determine that the communication path between the transmitting terminal and the receiving terminal is a NLOS path.

In addition, in a case that the kurtosis factor is used as the channel statistical characteristic, the kurtosis of the channel parameter obtained by channel estimation may be calculated as a ratio of the fourth moment of the channel parameter to a square of the second moment of the channel parameter. Kurtosis may be used to measure whether a channel parameter has a peak value relative to a normal distribution. A channel parameter with high kurtosis generally has an obvious peak value near its average value, where the channel parameter declines fast and has an obvious tail; while the channel parameter with low kurtosis tends to be relatively flat near the average value without any peak. In a case of a large value of the kurtosis, it tends to determine that the communication path between the transmitting terminal and the receiving terminal is an LOS path. In a case of a small value of the kurtosis, it tends to determine that the communication path between the transmitting terminal and the receiving terminal is a NLOS path.

In a case of using the space time frequency channel correlation function as the channel statistical characteristic, the space time frequency correlation of a channel frequency response may be calculated based on the following equation:

$$R(p_1 - p_2, q_1 - q_2, n_1 - n_2, \Delta t) \triangleq \sum_{l=1}^{L} E[a_l^{p_1,q_1}(t), a_l^{p_1,q_1}(t+\Delta t)^*]\exp(-j2\pi\Delta f(n_1-n_2)\tau_l) \quad (3)$$

where $p_1$ and $p_2$ represent indexes of transmit antennas, $q_1$ and $q_2$ represent indexes of receiving antennas, $n_1$ and $n_2$ represent subcarrier indexes, $\Delta t$ represents a time difference, $\Delta f$ represents a frequency interval, L represents the number of paths, $a_l^{p_r p_t}$ represents the path gain of path 1, and $\tau_l$ represents a delay of the path 1. With increases of space interval and time interval, correlation of NLOS component will approach zero, while an absolute value of the correlation of an LOS component is constant as the space interval and time interval change. Based on this, a calculated value of the above-mentioned space-time-frequency correlation may be used to distinguish the NLOS path and the LOS path from each other.

For example, the determination unit 101 is further configured to acquire a reference value of the channel statistical characteristic from a base station or an RUS, and determine whether the communication path is an LOS path or a NLOS path by comparing the calculated channel statistical characteristic with the reference value.

For example, in a case of using the Ricean K-factor, the reference value is a reference value of the Ricean K-factor. For example, assuming that the reference value is 5, the communication path is determined as an LOS path if the calculated Ricean K-factor is greater than 5, and the communication path is determined as a NLOS path if the calculated Ricean K-factor is smaller than 5. Similarly, in a case of using the kurtosis factor, the reference value is a reference value of the kurtosis factor. In a case of using the space time frequency correlation function, the reference value may be a value or a value range of the space time frequency correlation when the $p_1-p_2$, $q_1-q_2$, $n_1-n_2$, and $\Delta t$ are predefined.

The reference value may be obtained by performing measurements and statistical analysis of measurement results in advance, for example. In addition, the reference value may vary for different regions, and may be therefore stored in a digital map as an attributes of each node in the digital map. The reference value may be sent periodically, or sent based on a predetermined condition, that is, sent in an event-driven mode. The operation and signaling process related to the acquisition and transmission of the reference value are described in detail in a second embodiment.

If the determination unit 101 determines that the communication path between the first communication device and the second communication device is an LOS path, the positioning unit 102 may use information obtained through the LOS path in cooperative location for the first communication device and the second communication device. The cooperative location means that the first communication device and the second communication device determine their respective positions through cooperative methods such as exchanging information. Since only the information obtained through the LOS path is used for location, the accuracy of the positioning may be improved.

For example, the information obtained through the LOS path may include a distance between the first communication device and the second communication device estimated based on the transmission of the LOS path, information transmitted through the LOS path, and the like. The positioning operation for a vehicle (communication device) may be performed by the vehicle or by an RSU, or may be performed by an additionally provided central processing device in a centralized manner. For example, in a case that the electronic apparatus 100 is located in a vehicle, the positioning operation may be performed in a distributed manner by the positioning unit 102 of the electronic apparatus 100 in each vehicle. In a case that the electronic apparatus 100 is located in an RSU, positioning operation may be performed in a relatively centralized manner by the positioning unit 102 of the electronic apparatus 100.

According to whether the location information of the communication device is regarded as a random variable, the cooperative location technology may be divided into non-Bayesian estimation and Bayesian estimation. Non-Bayesian estimation treats the position of each communication device as an unknown constant, and includes algorithms such as Least Square (LS) and Maximum Likelihood (ML). An LS estimator does not consider statistical information of the noise, while an ML estimator considers statistical information of a noise source and maximizes a likelihood function.

Figure 4:
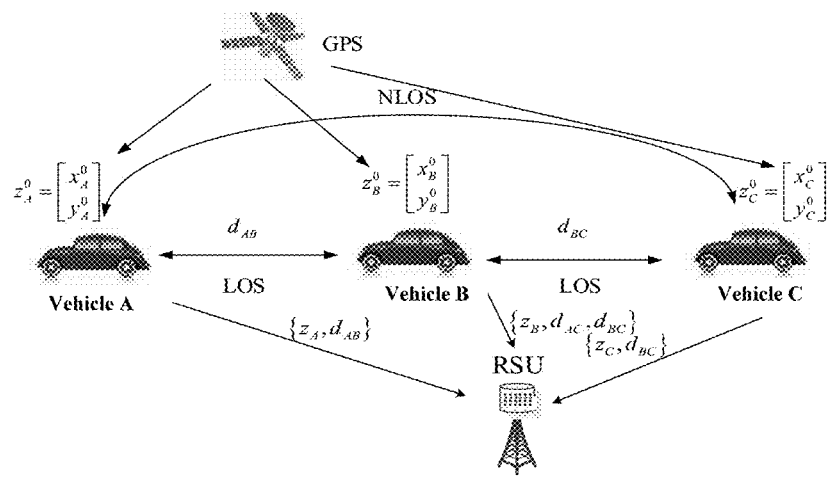
FIG. 4 shows an example of cooperative location for vehicles.

A positioning process based on the non-Bayesian estimation algorithm using the LS estimator is described below with reference to a specific example shown in FIG. 4.

It is assumed that there are three vehicles involved in the positioning, namely vehicle A, vehicle B and vehicle C. For example, the determination unit 101 determines, based on the statistical characteristic of each sidelink channel, that there is an LOS path between vehicle A and vehicle B, there is an LOS path between vehicle B and vehicle C, and there is no LOS path between vehicle A and vehicle C due to being blocked by vehicle B, as shown in FIG. 4.

A position of a vehicle is represented by $z_M^l$, where the superscript 1 of z represents an iteration index, and the subscript M represents a name of the vehicle (in this example, being A, B or C). The $z_M^l$ involves two elements that are abscissa $x_M^l$ and ordinate $y_M^l$. The $d_{MN}$ represents a distance between vehicle M and vehicle N. The NLOS path is not considered in the LS estimator, that is, the communication path between vehicle A and vehicle C is not considered.

First, vehicle A, vehicle B, and vehicle C estimate their respective initial positions and measure a distance between vehicles with an LOS path. Specifically, the distance between two vehicles with an LOS path may be obtained based on a TOA of the sidelink. The estimation of initial positions of vehicle A, vehicle B, and vehicle C may be obtained from GPS signals.

As an example, an RSU may be used to locate vehicle A, vehicle B, and vehicle C. In this case, the vehicles transmit the estimation of the initial positions and the distance between two vehicles with an LOS path to the RSU via the sidelink. The RSU sets an iteration step size g and the number of times of iterations N, sets the iteration index l to 1, and performs the iteration operation to estimate positions of vehicle A, vehicle B, and vehicle C. As another example, the LS estimation may be performed by the vehicles in a distributed manner.

For example, position $z_A^l$ of vehicle A is determined by the following equation (4):

$$z_A^l = z_A^{l-1} + g(d_{AB} - \hat{d}_{AB}^{l-1})e_{AB}^{l-1} \quad (4)$$

where $$\hat{d}_{AB}^{l-1} = \|z_A^{l-1} - z_B^{l-1}\| \tag{5}$$

$$e_{AB}^{l-1} = \frac{z_A^{l-1} - z_B^{l-1}}{\|z_A^{l-1} - z_B^{l-1}\|} \tag{6}$$

The position $z_B^l$ of vehicle B is determined by the following equation (7):

$$z_B^l = z_B^{l-1} + g(d_{AB} - \hat{d}_{AB}^{l-1})e_{AB}^{l-1} + g(d_{BC} - \hat{d}_{BC}^{l-1})e_{BC}^{l-1} \tag{7}$$

where $$\hat{d}_{BC}^{l-1} = \|z_B^{l-1} - z_C^{l-1}\| \tag{8}$$

$$e_{AB}^{l-1} = \frac{z_B^{l-1} - z_C^{l-1}}{\|z_B^{l-1} - z_C^{l-1}\|} \tag{9}$$

The position $z_C^l$ of vehicle C is determined by the following equation (10):

$$z_C^l = z_C^{l-1} + g(d_{BC} - \hat{d}_{BC}^{l-1})e_{BC}^{l-1} \tag{10}$$

Figure 5:
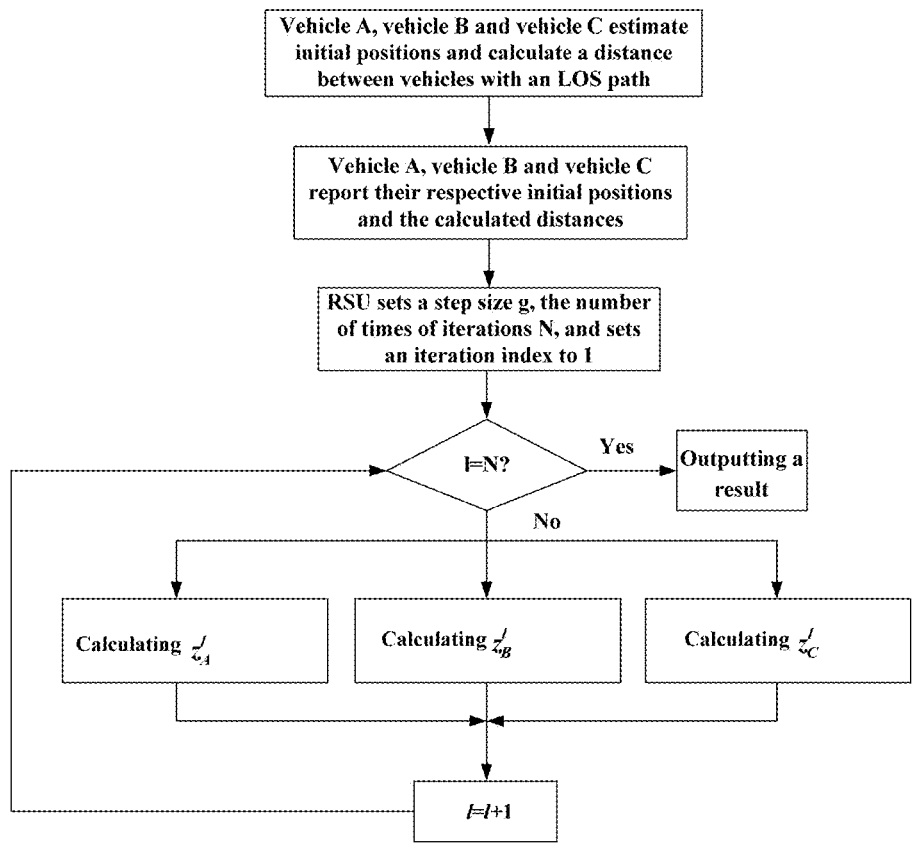
FIG. 5 shows an example of a flowchart of a positioning process performed by a roadside unit.

After the above iteration is completed (when l=N), the positions of vehicle A, vehicle B and vehicle C are obtained. For ease of understanding, FIG. 5 shows a flowchart of LS estimation performed by the RSU to locate vehicle A, vehicle B, and vehicle C. If the LS estimation is performed by the vehicles in a distributed manner, a step of reporting to the RSU is not included, and only one of $z_A^l$, $z_B^l$ and $z_C^l$ corresponding to itself is calculated in the iteration.

On the other hand, the Bayesian estimation includes, for example, Minimum Mean Squared Error (MMSE) estimation and Maximum A Posteriori (MAP) estimation. An MMSE estimator obtains a mean value of a posterior distribution, and an MAP estimator obtains a pattern of a posterior distribution.

A positioning process based on the Bayesian estimation algorithm using the MAP estimator is described below with reference to a specific example shown in FIG. 6 and FIG. 7.

Similarly, it is assumed that there are three vehicles involved in positioning, namely vehicle A, vehicle B and vehicle C. The determination unit 101 determines, based on the statistical characteristic of the sidelink channel, that there is an LOS path between vehicle A and vehicle B, there is an LOS path between vehicle B and vehicle C, and there is no LOS path between vehicle A and vehicle C due to being blocked by vehicle B, as shown in FIG. 7.

It is supposed that the vehicles are driving in a tunnel or underground parking lot with a weak GPS signal. In this case, the vehicles cannot obtain information about their locations. The positioning for the vehicles includes two stages: an initialization stage and an iteration stage.

Figure 6:
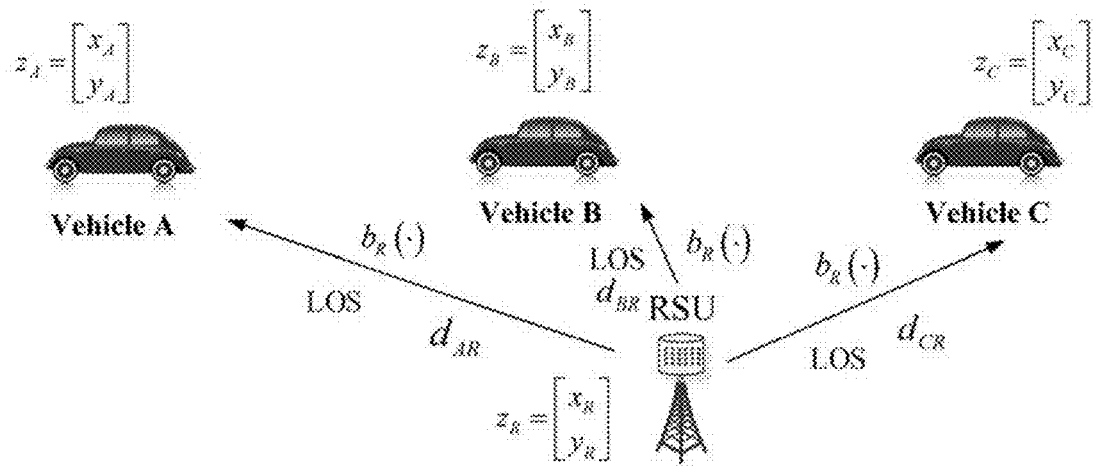
FIG. 6 shows another example of the cooperative location for vehicles.
Figure 7:
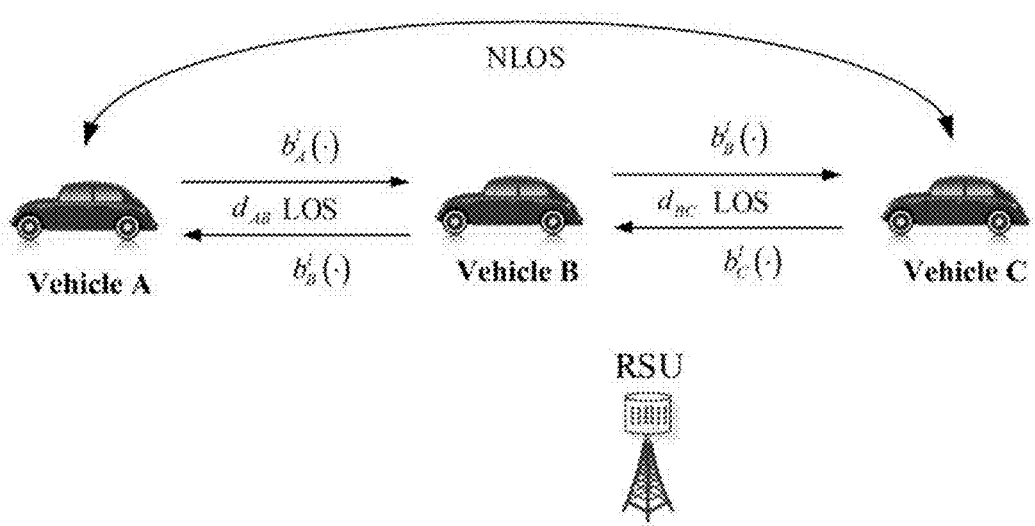
FIG. 7 shows another example of the cooperative location for vehicles.

A schematic diagram of the initialization stage is shown in FIG. 6. In FIG. 6, $z_M$ represents a location of a vehicle or an RUS (the value of M being A, B, C, or R); $z_M$ has two elements that are abscissa $x_M$ and ordinate $y_M$; $d_{MR}$ represents a distance between vehicle M and the RSU; and $b_R(\cdot)$ represents confidence information transmitted by the RSU. Since the position of the RSU is determined, the confidence information $b_R(\cdot)$ of the RSU is a δ function. The RSU may broadcast $b_R(\cdot)$ to the vehicles through the sidelink. After receiving the confidence information, vehicle M may measure the distance between vehicle M and the RSU by measuring a TOA of the sidelink, and calculate and output the respective confidence information.

Description is given below by taking vehicle A as an example. Using $\mu_{AR}^1(z_A)$ to represent a posterior probability distribution of the position of vehicle A, $\mu_{AR}^1(z_A)$ may be expressed by the following equation (11):

$$\mu_{AR}^1(z_A) = \int p(d_{AR}|z_R, z_A) b_R^0(z_R) dz_R \tag{11}$$

where $$p(d_{AR}|z_R, z_A) = \frac{1}{\sqrt{2\pi\sigma_{AR}^2}} \exp\left\{-\frac{(d_{AR} - \|z_R - z_A\|)^2}{2\sigma_{AR}^2}\right\} \tag{12}$$

Where $\sigma_{AR}^2$ represents noise variance of the distance estimation. Initial confidence information of vehicle A may be calculated based on the following equation (13):

$$b_A^1(z_A) = b_A^0(z_A) \mu_{AR}^1(z_A) \tag{13}$$

The initial confidence information of vehicle B and vehicle C are calculated in a similar manner.

Next, the iteration stage of the MAP estimation is described with reference to FIG. 7. In each cycle of the iteration, new confidence information is calculated based on previous confidence information. In the iteration, only the LOS paths are considered, that is, only the communication path between vehicle A and vehicle B and the communication path between vehicle B and vehicle C are considered. The number of iterations is still set to N and an initial value of the iteration index l is set to 2 and increments by 1 for each cycle of the iteration. The calculation for the confidence information during the iteration stage is illustrated by taking vehicle B as an example, as shown in the following equation (14).

$$b_B^l(z_B) = b_B^{l-1}(z_B) \mu_{AB}^{l-1}(z_B) \mu_{BC}^{l-1}(z_B) \mu_{BR}^{l-1}(z_R) \tag{14}$$

Where $b_M^l(\cdot)$ represents the confidence information, the subscript M of b represents the vehicle that transmits the confidence information (in this case being B), and the superscript l of b represents the iteration index.

In equation (14), $$\mu_{AB}^{l-1}(z_B) = \int p(d_{AB}|z_A, z_B) b_A^{l-2}(z_A) dz_A \tag{15}$$

$$\mu_{BC}^{l-1}(z_B) = \int p(d_{BC}|z_B, z_C) b_C^{l-2}(z_C) dz_C \tag{16}$$

$$\mu_{BR}^{l-1}(z_R) = \int p(d_{BR}|z_R, z_B) b_R^{l-2}(z_R) dz_R \tag{17}$$

where $d_{MN}$ represents the distance between vehicle M and vehicle N (where M and N are one of A, B and C respectively), which may be calculated based on the TOA of the sidelink between vehicle M and vehicle N. The above iteration terminates when l=N, and the confidence information of the locations of vehicle A, vehicle B, and vehicle C is output.

The MAP estimator may be implemented in a centralized manner or in a distributed manner. In a centralized location manner, for example, a central processing device may be provided. Each of the communication devices such as vehicles and RSUs respectively provides a distance between the communication devices based on an LOS path measurement to the central processing device, and the central processing device calculates positions of the vehicles based on the above equations. In a distributed location manner, each vehicle broadcasts its confidence information through the sidelink, and infers the position of itself based on the distance to another vehicle and information, such as confidence information, received from the other vehicle.

The above describes an example of performing cooperative location for communication devices based on the information obtained through the LOS path, which is not limiting. The positioning unit 102 may also perform multilateration based on the information obtained through the LOS path. Specifically, for example, if the first communication device receives sidelink signals from at least three second communication devices (the second communication devices are other vehicles or RSUs), and there exist LOS paths between the first communication device and the at least three second communication devices, the first communication device may estimate its own location based on these sidelink signals in a case that the location information of the at least three second communication devices is known.

Figure 8:
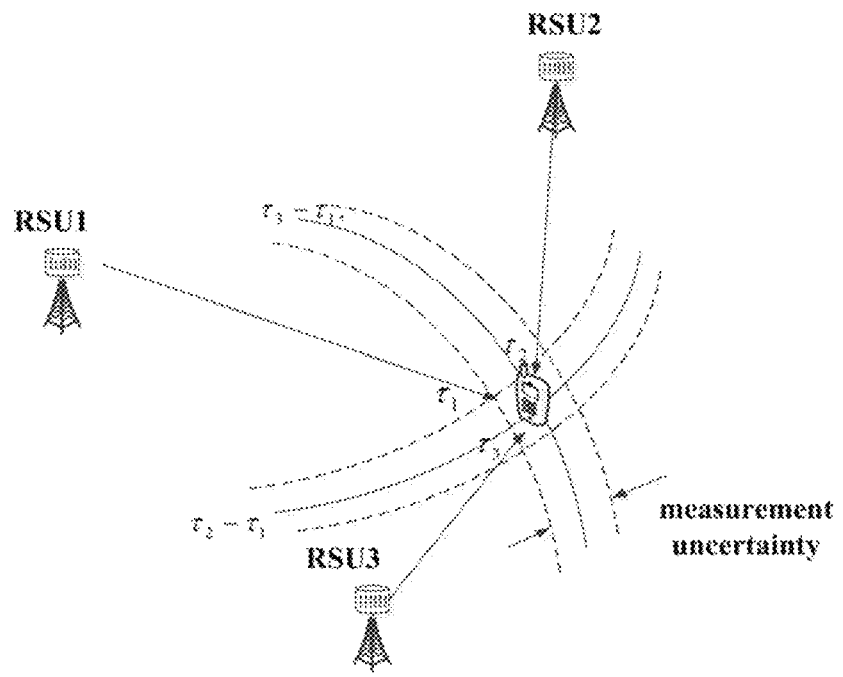
FIG. 8 shows a schematic diagram of principle of multilateration.

FIG. 8 shows an example of a location schematic diagram in this case. As shown in FIG. 8, in a case that the first communication device receives location signals of three RSUs which are dispersed and whose geographical positions are known, and the exists an LOS path between the first communication device and each of the RSUs, the position of the first communication device may be estimated using an OTDOA technology. It should be understood that although the second communication device is shown as an RSU, it is not limited thereto, and the second communication device may also be a vehicle or a communication module on the vehicle. Specifically, a first user equipment measures TOAs, represented as $\tau_1$, $\tau_2$, and $\tau_3$, of the three LOS path signals from RSU1, RSU2, and RSU3. Taking RSU1 as a reference RSU, the two OTDOAs of RSU2 and RSU3 with respect to RSU1 may be represented as $\tau_{2,1}=\tau_2-\tau_1$ and $\tau_{3,1}=\tau_3-\tau_1$ respectively. The position of the first communication device is determined as an intersection of two curves determined for each of the OTDOAs.

Figure 9:
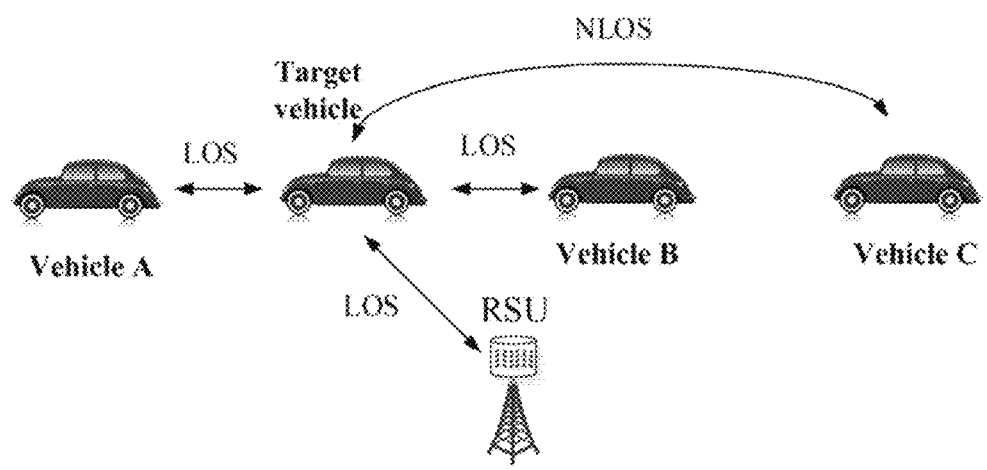
FIG. 9 shows a schematic diagram of an instance of the multilateration.

FIG. 9 shows a schematic diagram of an instance of the multilateration. As shown in FIG. 9, there are LOS paths between vehicle A and a target vehicle, between vehicle B and the target vehicle, and between the RSU and the target vehicle, and there is no LOS path between vehicle C and the target vehicle. Therefore, location signals from vehicle A, vehicle B and the RSU are used by the target vehicle to determine its own position. Specifically, assuming that vehicle A, vehicle B, vehicle C, and the RSU all are aware of their respective positions, and simultaneously transmit location signals to the target vehicle by appropriate sidelink resources allocation, the target vehicle, for example, uses the method in the present disclosure to determine whether each communication path is an LOS path or a NLOS path, and then uses the location signals of vehicle A, vehicle B, and the RSU (corresponding to the determined LOS paths) to estimate TOAs, and uses the above-mentioned OTDOA technology to estimate the position of the target vehicle.

In summary, the electronic apparatus 100 according to the present embodiment distinguishes the LOS path and the NLOS path based on the channel statistical characteristic of the sidelink channel in the Internet of Vehicles, and uses the information obtained through the LOS path for cooperative location, so as to accurately locate a communication device in various situations.

Second Embodiment

As described above, the channel statistical characteristic for distinguishing the LOS path and the NLOS path may be obtained by measurement and statistical analysis in advance. The channel statistical characteristic may be provided by a base station such as a gNB to communication devices (vehicles), or may be provided by an RSU to communication devices (vehicles).

Figure 10:
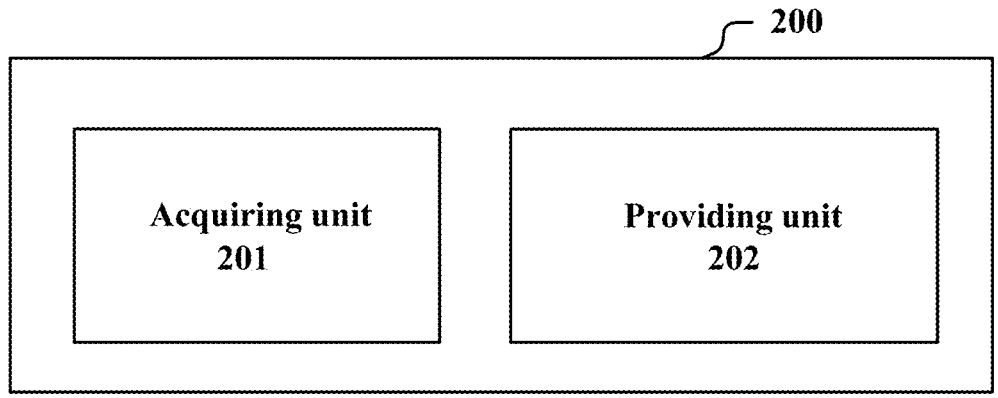
FIG. 10 is a block diagram showing functional modules of an electronic apparatus for wireless communications according to another embodiment of the present disclosure.

Correspondingly, according to another embodiment of the present disclosure, an electronic apparatus 200 is provided. FIG. 10 shows a block diagram of functional modules of the electronic apparatus 200, including: an acquiring unit 201, configured to acquire a reference value of a channel statistical characteristic of a sidelink channel at each position, the reference value being used to distinguish whether the corresponding sidelink channel is an LOS path or a NLOS path; and a providing unit 202, configured to provide the reference value to a communication device in an Internet of Vehicles.

The acquiring unit 201 and the providing unit 202 may be implemented by one or more processing circuitries, and the processing circuitry may be implemented as a chip or a processor, for example. Moreover, it should be understood that various functional units in the electronic apparatus shown in FIG. 10 are only logical modules divided based on their specific functions, and are not intended to limit a specific implementation.

The electronic apparatus 200 may be provided on a base station side or communicatively connected to a base station, or may be provided on an RSU side or communicatively connected to an RSU, for example. The base station described in the present disclosure may be a transmit receive point (TRP) or an access point (AP). Here, it should be noted that the electronic apparatus 200 may be implemented in a chip level or in an apparatus level. For example, the electronic apparatus 200 may operate as the base station or RSU itself, and may further include an external apparatus such as a memory and a transceiver (not shown in the drawings). The memory may be configured to store programs required for performing various functions by the base station or RSU and related data information. The transceiver may include one or more communication interfaces to support communications with different apparatus (for example, user equipment, another base station or RSU, or the like). The specific implementation of the transceiver is not particularly limited herein.

For example, the acquiring unit 201 is configured to acquire the reference value by performing measurement. The measurement may be performed in advance. For example, one or more measuring vehicles continuously transmits pilot signals, and a receiving vehicle working as a receiving terminal performs channel estimation based on the received pilot signals, calculates the channel statistical characteristic based on results of the channel estimation, and performs statistical analysis to obtain the reference value of the channel statistical characteristic of a corresponding area such as a certain section of road. The measured reference value may be saved in the base station or RSU.

In addition, information of the measured reference value may also be associated with a digital map, so that each node of the digital map is stored with the information of the reference value of the channel statistical characteristic of the node. In this way, the base station or RSU may obtain the reference value for a position by looking up the digital map. Alternatively, the base station or RSU (specifically, the providing unit 202) may provide at least a part of the digital map to a communication device. In this way, the communication device may compare its currently measured channel statistical characteristic with the reference value at a corresponding position in the digital map to determine whether the communication path is the LOS path or the NLOS path. It should be understood that the storage form of the reference value is not limited to the above, which is only an example.

In addition, the channel statistical characteristic may include one or more of a Ricean K-factor, a Kurtosis factor and a space time frequency channel correlation function.

Examples of these channel statistical characteristics are specifically described in the first embodiment and are not repeated hereinafter.

In an example, the electronic apparatus 200 is provided on the base station side, and the providing unit 202 may provide the reference value via a Uu interface. For example, the providing unit 202 may be configured to provide the reference value via one of a physical broadcast channel (PBCH) and a physical downlink shared channel (PDSCH). The reference value may be included in one of basic configuration information, remaining minimum system information, other system information, and data information. The reference value may be provided periodically, or may be provided in a case of satisfying a predetermined condition, that is, in an event-driven manner.

Correspondingly, the electronic apparatus 100 is located, for example, on a communication device side, and its transceiver acquires the reference value via a downlink between the base station and the communication device. The downlink is, for example, one of a PBCH and a PDSCH.

Figure 11:
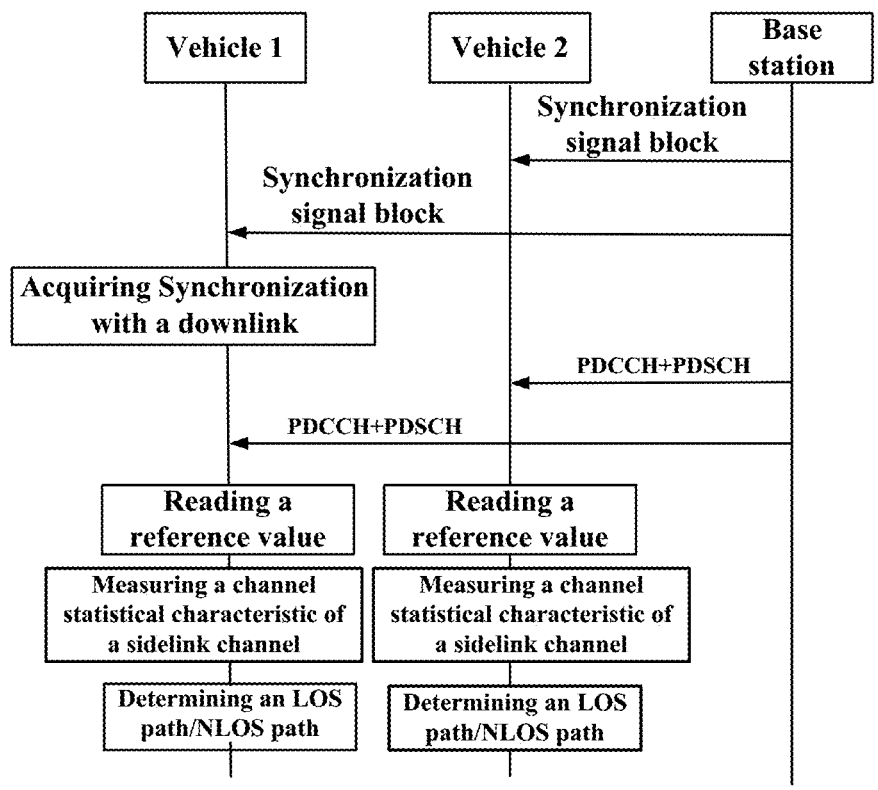
FIG. 11 shows an example of an information procedure between a base station and vehicles.
Figure 12:
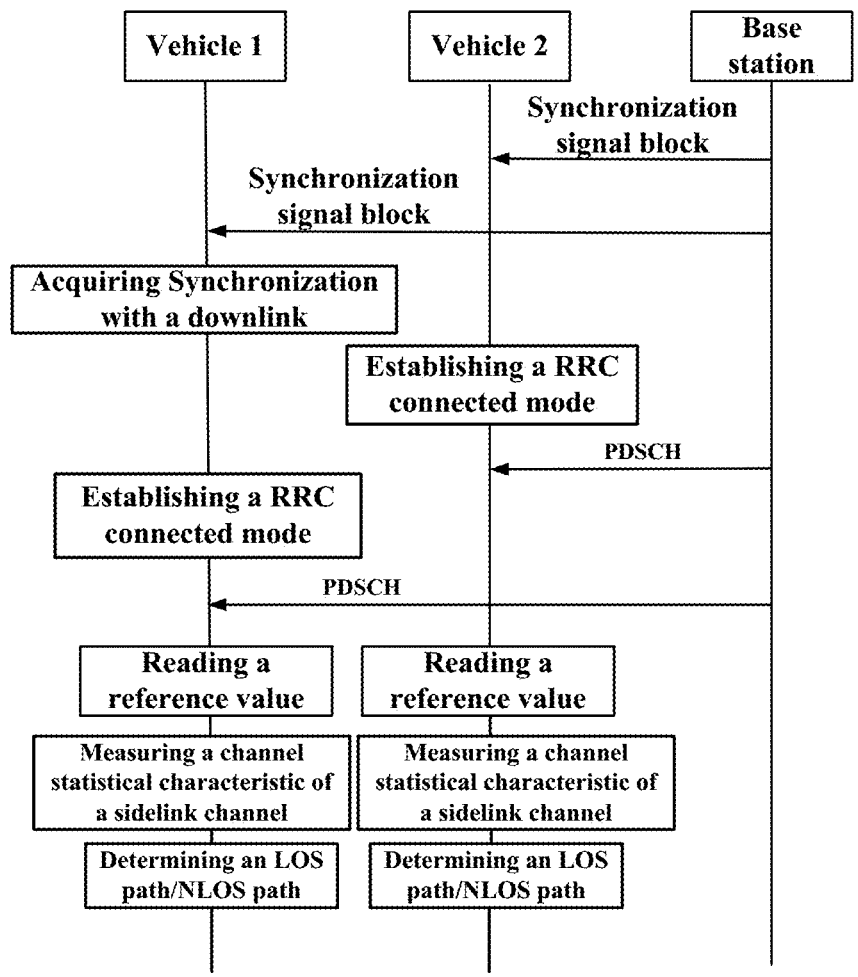
FIG. 12 shows another example of an information procedure between a base station and vehicles.

An example of an information procedure between the base station and the communication devices is described with reference to FIG. 11 and FIG. 12 in conjunction with operations of the electronic apparatus 100 described in the first embodiment. Vehicles are shown as examples of the communication devices, and vehicle 1 and vehicle 2 are shown. FIG. 11 and FIG. 12 respectively show examples of the information procedure where the base station provides the reference value through the Uu interface.

As shown in FIG. 11, a vehicle is synchronized with a downlink cellular signal by using a synchronization signal block (SSB). For example, in 5G NR, a synchronization channel and a broadcast channel are transmitted in a manner of forming a SSB, where the broadcast channel may provide basic configuration information, and the reference value may be included in the basic configuration information.

Optionally, in a case that the reference value is not included in the basic configuration information, as shown in FIG. 11, after obtaining synchronization with the downlink, the vehicle may find a physical downlink control channel (PDCCH) by reading a PBCH, where the PDCCH schedules the PDSCH. Vehicle 1 and vehicle 2 may read RMSI provided via the PDSCH to obtain information of the reference value included therein. The RMSI provides scheduling information for all other system information blocks. Alternatively, in a case that the reference value is not included in the RMSI but included in the other system information, the vehicle 1 and vehicle 2 read the other system information provided via the PDSCH.

After obtaining the information of the reference value, vehicle 1 and vehicle 2 obtain the channel statistical characteristic of a corresponding sidelink by measuring a sidelink signal from another vehicle or RSU, and determine whether the corresponding sidelink is an LOS path or a NLOS path based on the channel statistical characteristic and the reference value, as described in the first embodiment. Meanwhile, vehicle 1 and vehicle 2 may also transmit reference signals such as pilot signals or training sequences to another vehicle.

In the example shown in FIG. 11, there is no radio resource control (RRC) connection between the base station and the vehicles, and the base station periodically transmits the reference value.

In addition, although not shown in FIG. 11, after acquiring the synchronization with downlink, a vehicle may further initiate a request to the base station through a physical random access channel (PRACH), and then read the information of the reference value in other system information through the PDSCH. In this case, there is no RRC connection between the base station and each vehicle either, and the operation of the base station transmitting the reference value is event-driven (in response to a request from the vehicle).

FIG. 12 shows an example of an information procedure in a case that an RRC connection is established between a base station and each vehicle. First, similar to that is shown in FIG. 11, a vehicle is synchronized with a downlink cellular signal by using an SSB. Then, the RRC connection is established between each vehicle and the base station. The base station allocates downlink physical resources to the vehicles, and transmits the reference value on the resources. Next, the vehicles read information of the reference value via the PDSCH. In this case, there is an RRC connection between the base station and the first communication device, and the operation of the base station transmitting the reference value is event-driven.

Similarly, after obtaining the information of the reference value, vehicle 1 and vehicle 2 obtain the channel statistical characteristic of a corresponding sidelink by measuring a sidelink signal from another vehicle or RSU, and determine whether the corresponding sidelink is an LOS path or a NLOS path based on the channel statistical characteristic and the reference value, as described in the first embodiment. Meanwhile, vehicle 1 and vehicle 2 may transmit reference signals such as pilot signals or training sequences to another vehicle.

In another example, the electronic apparatus 200 is provided on the RSU side, and the providing unit 202 may provide the reference value via a Uu interface. For example, the providing unit 202 may be configured to provide the reference value via one of a physical sidelink broadcast Channel (PSBCH) and a physical sidelink shared channel (PSSCH). The reference value may be included in one of basic configuration information, sidelink control information (SCI), and data information. The reference value may be provided periodically, or be provided in a case of satisfying a predetermined condition, that is, in an event-driven manner.

Correspondingly, the electronic apparatus 100 is located, for example, on a communication device side, and its transceiver obtains the reference value via a sidelink between the RSU and the communication device. The sidelink is, for example, one of the PSBCH and the PSSCH.

Figure 13:
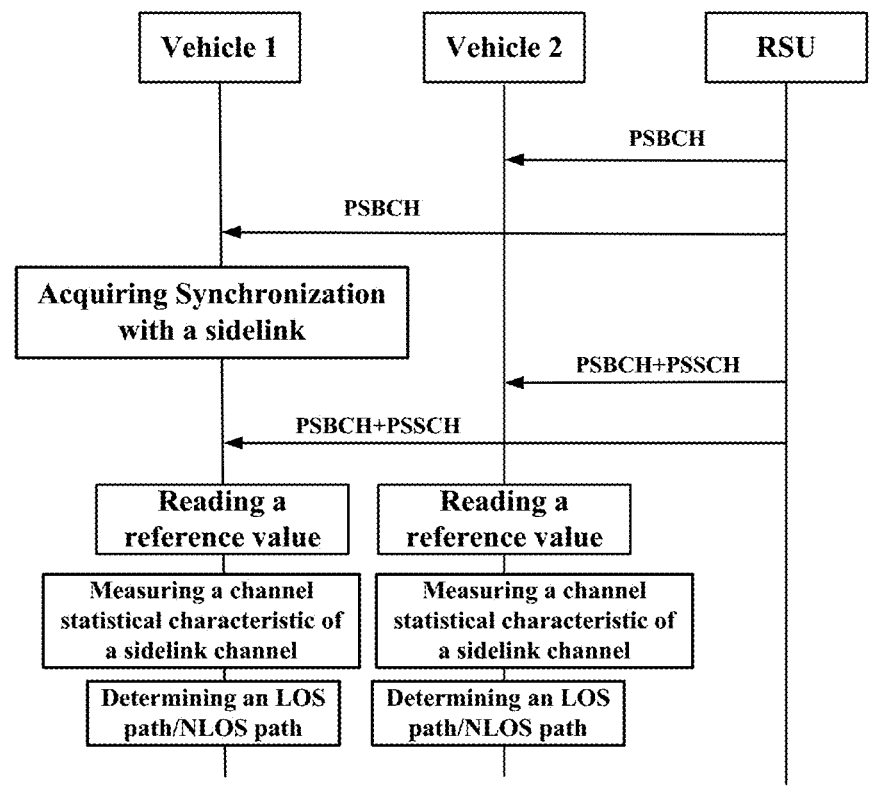
FIG. 13 shows an example of an information procedure between an RSU and vehicles.
Figure 14:
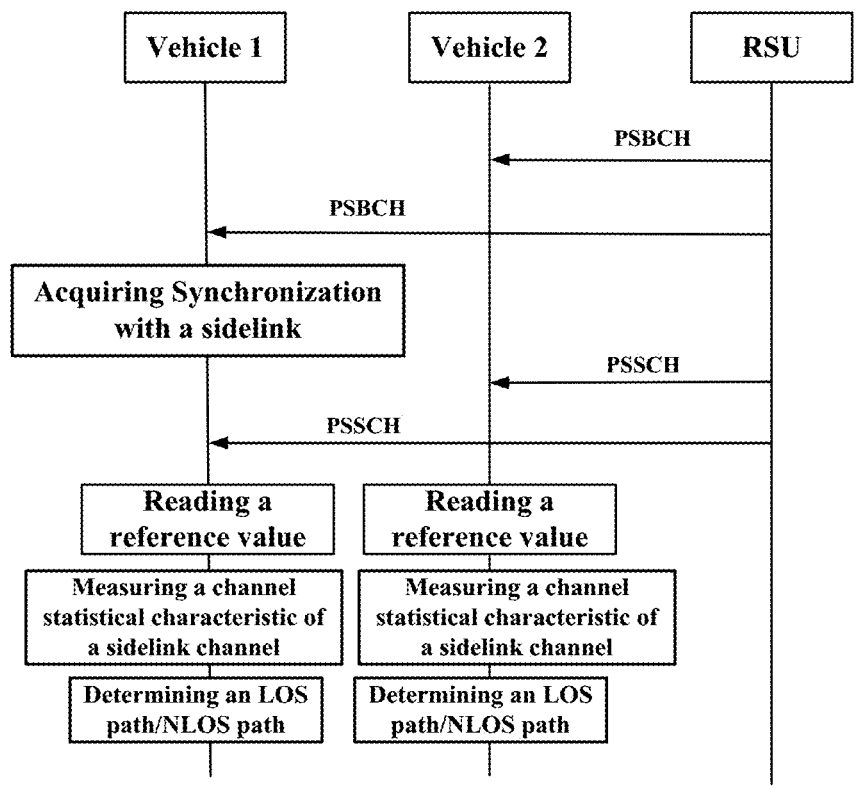
FIG. 14 shows another example of an information procedure between an RSU and vehicles.

FIG. 13 and FIG. 14 respectively show examples of an information procedure of the RSU providing the reference value through the PC5 interface.

As shown in FIG. 13, a vehicle uses a sidelink synchronization signal (which is primary synchronization signal plus secondary synchronization signal (PSSS+SSSS)) in the PSBCH to synchronize with a sidelink. Information of the reference value may be included in the PSBCH data payload, and the vehicles may read the information of the reference value from the PSBCH. In this case, the reference value is transmitted by the RSU periodically.

In FIG. 14, after synchronizing with the sidelink, the vehicle initiates a request to the base station through a PRACH to establish a sidelink connection. The base station allocates sidelink physical resources to each vehicle (not shown in FIG. 14). Then each vehicle reads the information of the reference value of the channel statistical characteristic transmitted by the RSU via the PSSCH on the physical resources. In this case, the operation of the RSU transmitting the reference value is event-driven.

In addition, although not shown in FIG. 14, the RSU may also transmit the information of the reference value via a physical sidelink control channel (PSCCH). In this case, the information of the reference value is included in the SCI.

After obtaining the information of the reference value, vehicle 1 and vehicle 2 obtain the channel statistical characteristic of a corresponding sidelink by measuring a sidelink signal from another vehicle or RSU, and determine whether the corresponding sidelink is an LOS path or a NLOS path based on the channel statistical characteristic and the reference value, as described in the first embodiment. Meanwhile, vehicle 1 and vehicle 2 may transmit reference signals such as pilot signals or training sequences to another vehicle.

In summary, the electronic apparatus 200 according to this embodiment can provide communication devices with a reference value of a channel statistical characteristic of a sidelink between the communication devices, so that the communication devices can determine an LOS path or NLOS path based on the reference value.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 15:
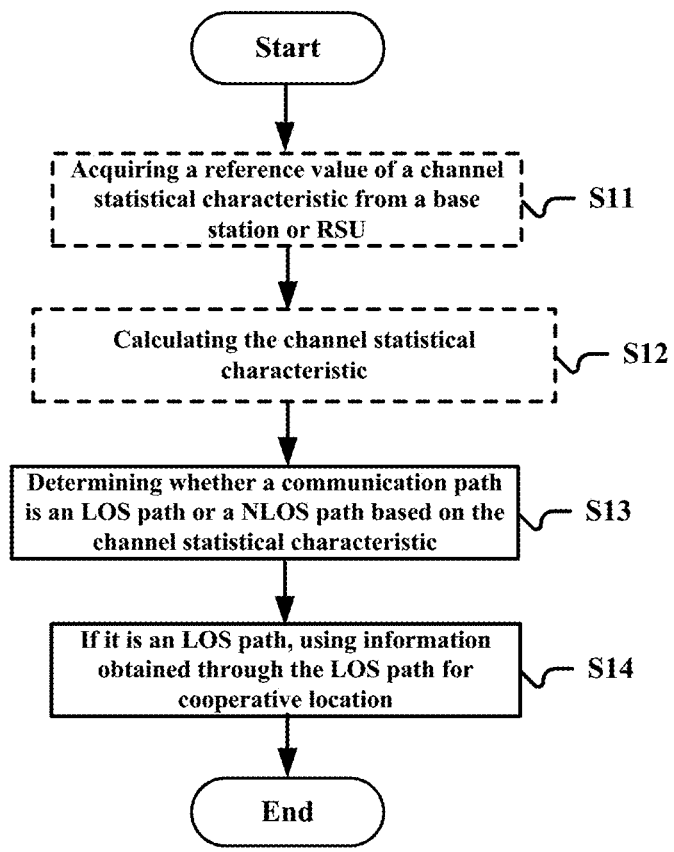
FIG. 15 is a flow chart of a method for wireless communications according to an embodiment of the present disclosure.

FIG. 15 shows flow chart of a method for wireless communications according to an embodiment of the present disclosure. The method includes: determining, based on a channel statistical characteristic of a sidelink channel between a first communication device and a second communication device in an IoV, whether a communication path between the first communication device and the second communication device is an LOS path or a NLOS path (S13); and if the communication path is the LOS path, using information obtained through the LOS path in cooperative location for the first communication device and the second communication device (S14). The method may be performed on the first communication device side. The first communication device and the second communication device may be a vehicle or RSU.

The channel statistical characteristic may include one or more of a Ricean K-factor, a Kurtosis factor and a space time frequency channel correlation function. As shown in a dashed line block in FIG. 15, the method may further include a step S12: calculating the channel statistical characteristic based on a reference signal received at the first communication device from the second communication device. For example, the reference signal may include a pilot signal or a training sequence. In step S12, channel estimation is performed based on the reference signal, and the channel statistical characteristic is calculated based on a result of the channel estimation.

In addition, as shown in another dashed line block in FIG. 15, the method may further include a step S11: acquiring a reference value of the channel statistical characteristic from a base station or RSU. In step S13, it is determined whether the communication path is an LOS path or a NLOS path by comparing the channel statistical characteristic calculated in step S12 with the reference value acquired in step S11.

For example, in step S11, the reference value may be acquired via a downlink between the base station and the first communication device. The downlink includes, for example, one of a PBCH and a PDSCH. Information of the reference value is included in one of basic configuration information, minimum system information, other system information, and data information.

Alternatively, in step S11, the reference value may be acquired via a sidelink between the RSU and the first communication device. The sidelink includes, for example, one of the PSBCH and the PSSCH. The information of the reference value is included in one of basic configuration information, sidelink control information, and data information.

As a format, the reference value may be included in a digital map, and used as an attribute of each node in the digital map. The reference value may be transmitted periodically or based on a predetermined condition.

In step S14, the information obtained through the LOS path may be used for the cooperative location in a manner of Bayesian estimation or non-Bayesian estimation. In addition, multilateration may also be performed using the information obtained through the LOS path.

For example, in the manner of Bayesian estimation, in a case that there exists the LOS path between the first communication device and the second communication device, a location of the first communication device may be determined based at least on a distance between the first communication device and the second communication device and information transmitted from the second communication device to the first communication device.

In the manner of Bayesian estimation, in a case that there exists the LOS path between the first communication device and the second communication device, information of the distance between the first communication device and the second communication device may be provided to a central processing device, so that the central processing device determines locations of all communication devices in a centralized manner.

Moreover, although not shown in FIG. 15, the method may further include transmitting the reference signal to the second communication device. In other words, the transmission on the sidelink is bi-directional and mutual.

Figure 16:
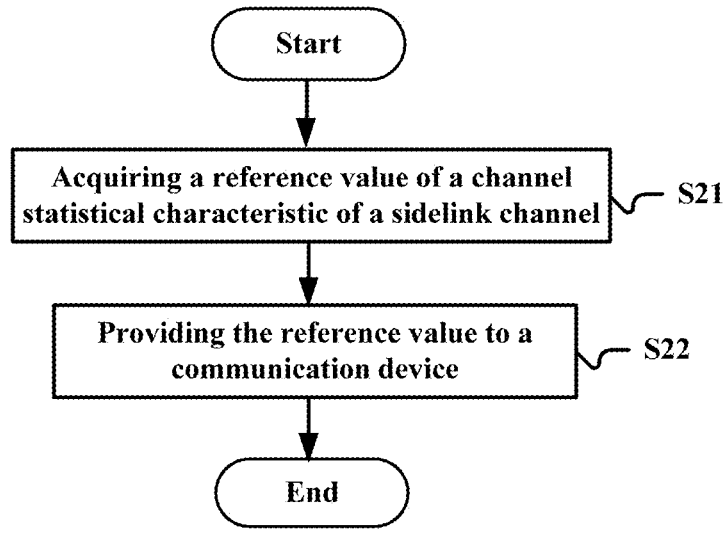
FIG. 16 is a flow chart of a method for wireless communications according to another embodiment of the present disclosure.

FIG. 16 shows a flow chart of a method for wireless communications according to another embodiment of the present disclosure. The method includes: acquiring a reference value of a channel statistical characteristic of a sidelink channel at each position, the reference value being used to distinguish whether the corresponding sidelink channel is an LOS path or a NLOS path (S21); and providing the reference value to a communication device in an Internet of Vehicles (S22). The method may be performed on a base station side or an RSU side.

In step S21, the reference value may be acquired by measuring. The channel statistical characteristic includes one or more of a Ricean K-factor, a Kurtosis factor and a space time frequency channel correlation function. In step S22, the reference value may be provided via a Uu interface or a PC5 interface. For example, the reference value may be provided periodically or provided in a case of satisfying a predetermined condition.

Note that the above methods may be used in combination with each other or separately, which have been described in detail in the first to second embodiments and will not be repeated herein.

The technology according to the present disclosure is applicable to various products.

For example, the electronic apparatus 200 may be implemented as various base stations. The base station may be implemented as any type of evolved node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote wireless head ends (RRH) located at positions different from the main body. In addition, various types of user equipment may each serves as a base station by performing functions of the base station temporarily or semi-permanently.

The electronic apparatus 100 may be implemented as various user equipments. The user equipment may be implemented as a mobile terminal (such as a smartphone, a tablet personal computer (PC), a notebook PC, a portable game terminal, a portable/dongle mobile router, and a digital camera) or a vehicle terminal (such as a car navigation apparatus). The user equipment may also be implemented as a terminal that performs machine-to-machine (M2M) communication (also referred to as a machine type communication (MTC) terminal). Furthermore, the user equipment may be a wireless communication module (such as an integrated circuitry module including a single die) mounted on each of the terminals described above.

Application Example Regarding a Base Station

First Application Example

Figure 17:
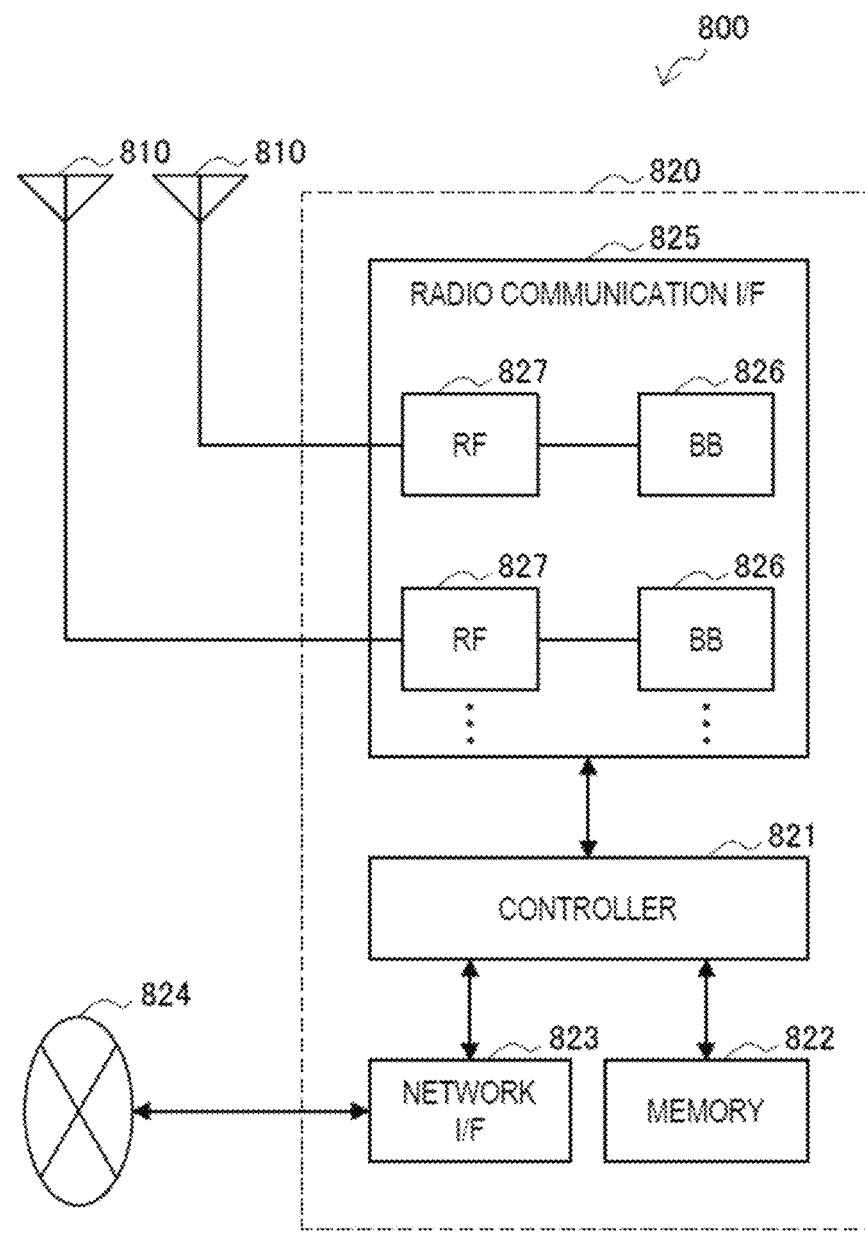
FIG. 17 is a block diagram showing a first example of an exemplary configuration of an eNB or gNB to which the technology according to the present disclosure may be applied.

FIG. 17 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 17, the eNB 800 may include the multiple antennas 810. For example, the multiple antennas 810 may be compatible with multiple frequency bands used by the eNB 800. Although FIG. 17 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 17, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 17. For example, the multiple RF circuits 827 may be compatible with multiple antenna elements. Although FIG. 17 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 17, a transceiver of the electronic apparatus 200 may be implemented by the radio communication interface 825. At least a part of the functions may be implemented by the controller 821. For example, the controller 821 may acquire and provide a reference value of the channel statistical characteristic of the sidelink channel to the communication device by performing the functions of the acquiring unit 201 and the providing unit 202.

Second Application Example

Figure 18:
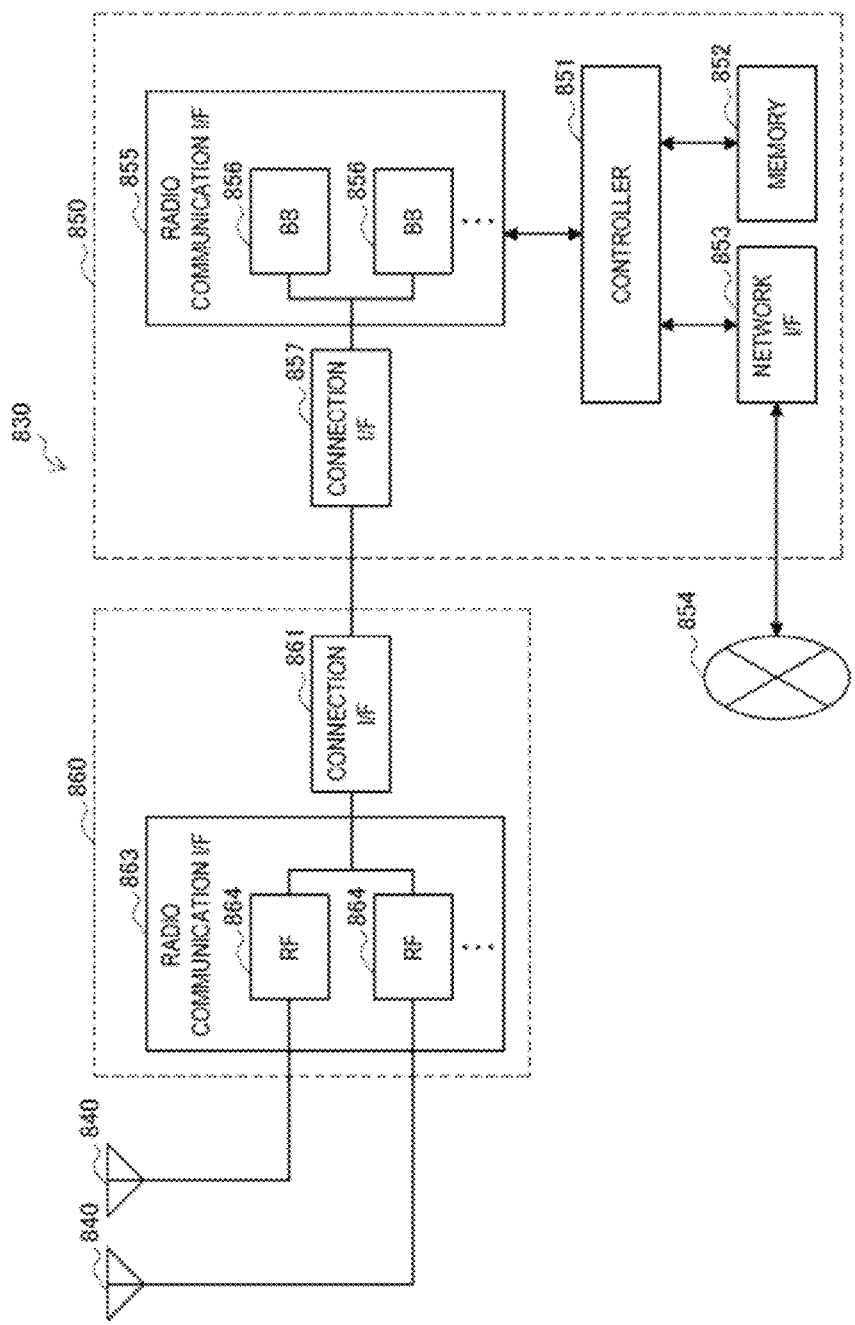
FIG. 18 is a block diagram showing a second example of an exemplary configuration of the eNB or gNB to which the technology according to the present disclosure may be applied.

FIG. 18 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 18, the eNB 830 may include the multiple antennas 840. For example, the multiple antennas 840 may be compatible with multiple frequency bands used by the eNB 830. Although FIG. 18 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except that the BB processor 856 is connected to an RF circuit 864 of the RRH 860 via the connection interface 857. As show in FIG. 18, the radio communication interface 855 may include the multiple BB processors 856. For example, the multiple BB processors 856 may be compatible with multiple frequency bands used by the eNB 830. Although FIG. 18 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 18. For example, the multiple RF circuits 864 may support multiple antenna elements. Although FIG. 18 shows the example in which the radio communication interface 863 includes the multiple RF circuits 864, the radio communication interface 863 may also include a single RF circuit 864.

In the eNB 830 shown in FIG. 18, a transceiver of the electronic apparatus 200 may be implemented by the radio communication interface 855 and/or radio communication interface 863. At least a part of the functions may be implemented by the controller 851. For example, the controller 851 may acquire and provide a reference value of the channel statistical characteristic of the sidelink channel to the communication device by performing the functions of the acquiring unit 201 and the providing unit 202.

Application Example Regarding User Equipment

First Application Example

Figure 19:
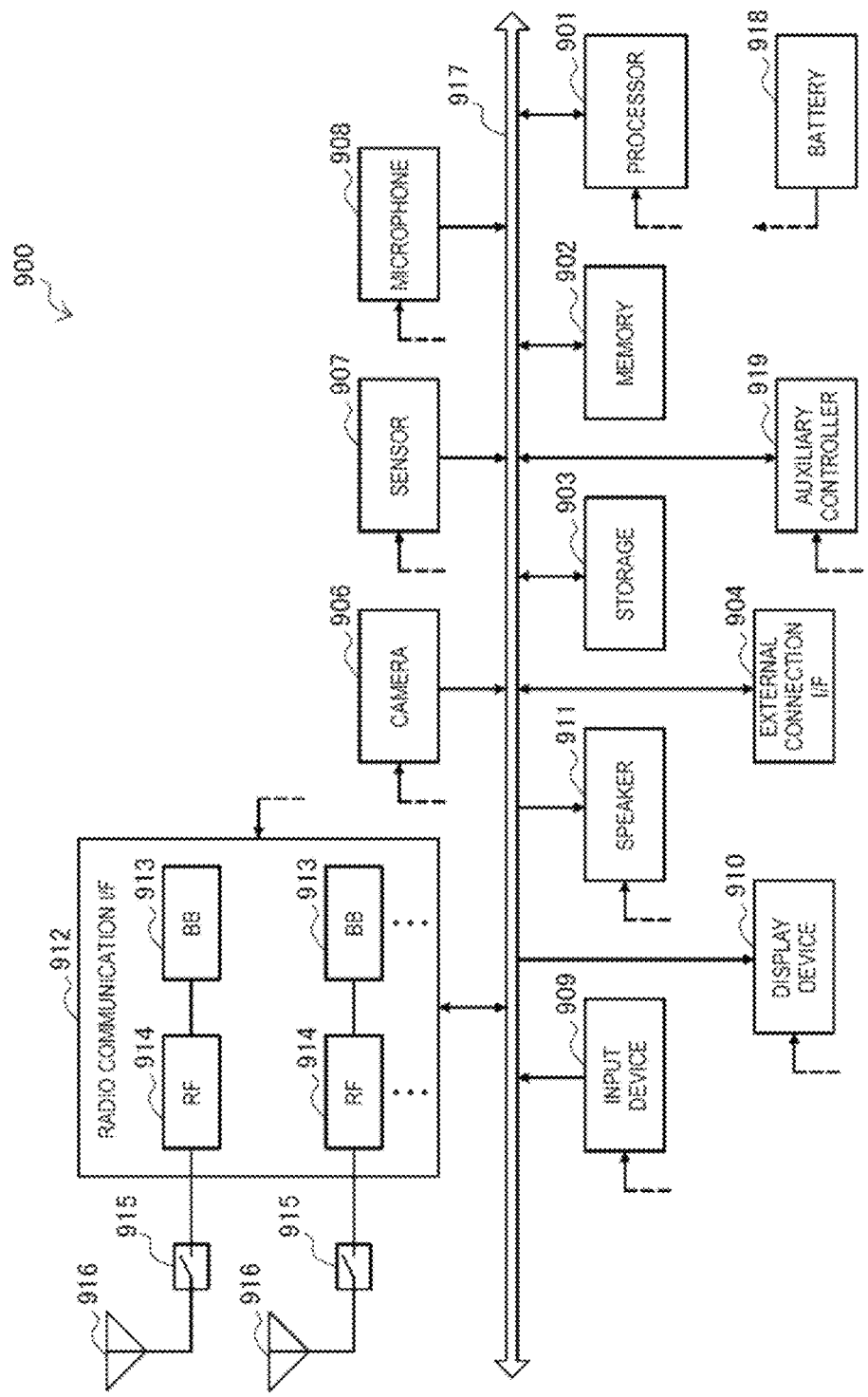
FIG. 19 is a block diagram showing an example of an exemplary configuration of a smartphone to which the technology according to the present disclosure may be applied.

FIG. 19 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 19 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 19. Although FIG. 19 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 19. Although FIG. 19 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 19 via feeder lines that are partially shown as dashed lines in FIG. 19. The auxiliary controller 919, operates a minimum necessary function of the smart phone 900, for example, in a sleep mode.

In the smartphone 900 shown in FIG. 19, a transceiver of the electronic apparatus 100 may be implemented by the radio communication interface 912. At least a part of functions may be implemented by the processor 901 or the auxiliary controller 919. For example, the processor 901 or the auxiliary controller 919 may perform the functions of the determination unit 101 and the positioning unit 102 to distinguish an LOS path from a NLOS path and use the information obtained through the LOS path in cooperative location for communication devices.

Second Application Example

Figure 20:
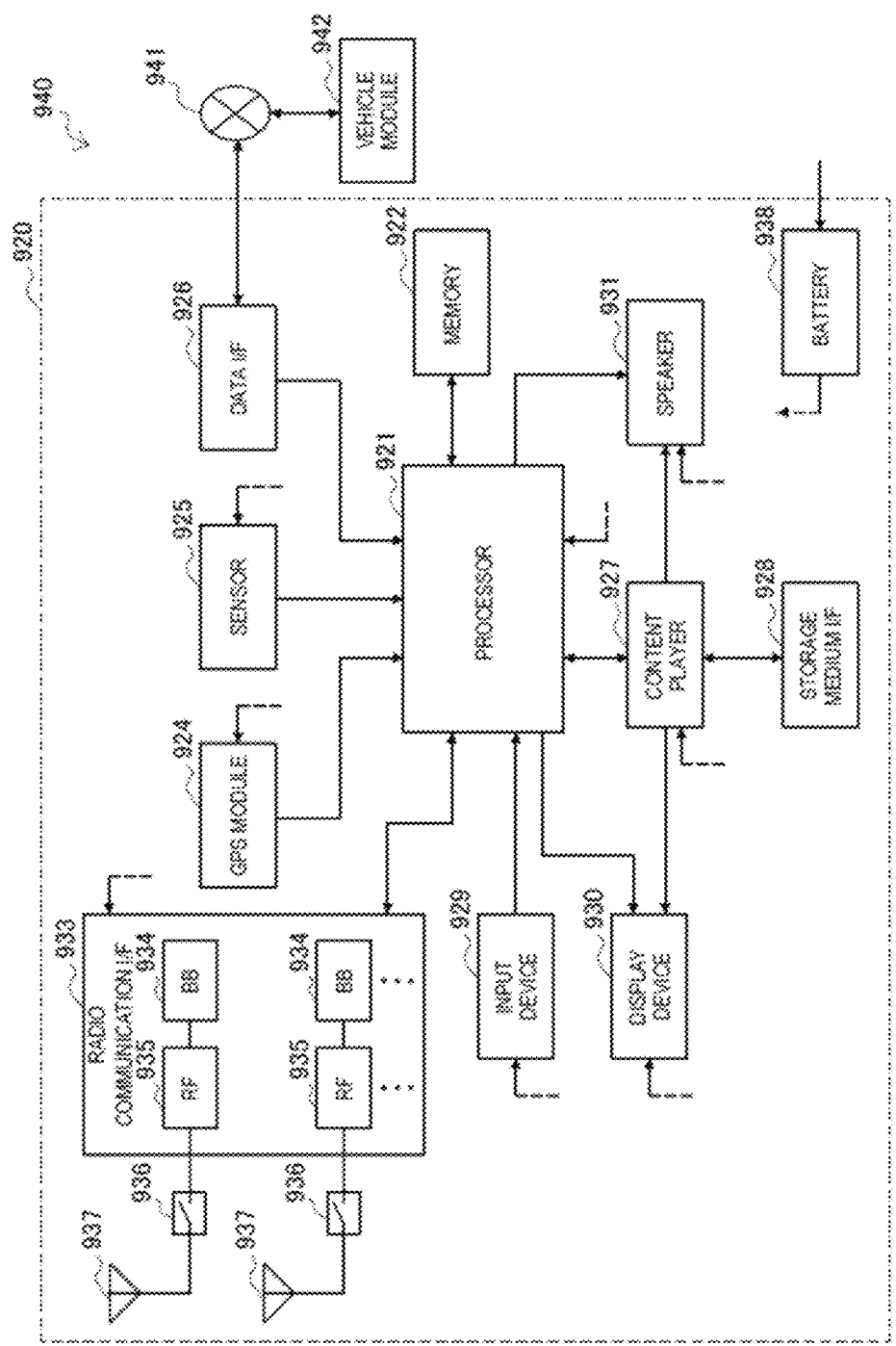
FIG. 20 is a block diagram showing an example of an exemplary configuration of a car navigation apparatus to which the technology according to the present disclosure may be applied.

FIG. 20 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/de-multiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 20. Although FIG. 20 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 20, the car navigation apparatus 920 may include the multiple antennas 937. Although FIG. 20 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 20 via feeder lines that are partially shown as dash lines in FIG. 20. The battery 938 accumulates power supplied from the vehicle.

In the car navigation apparatus 920 shown in FIG. 20, a transceiver of the electronic apparatus 100 may be implemented by the radio communication interface 933. At least a part of functions may be implemented by the processor 921. For example, the processor 921 may perform the functions of the determination unit 101 and the positioning unit 102 to distinguish an LOS path from a NLOS path and use the information obtained through the LOS path in cooperative location for communication devices.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2100 shown in FIG. 21) from a storage medium or network, wherein the computer is capable of implementing various functions when installed with various programs.

Figure 21:
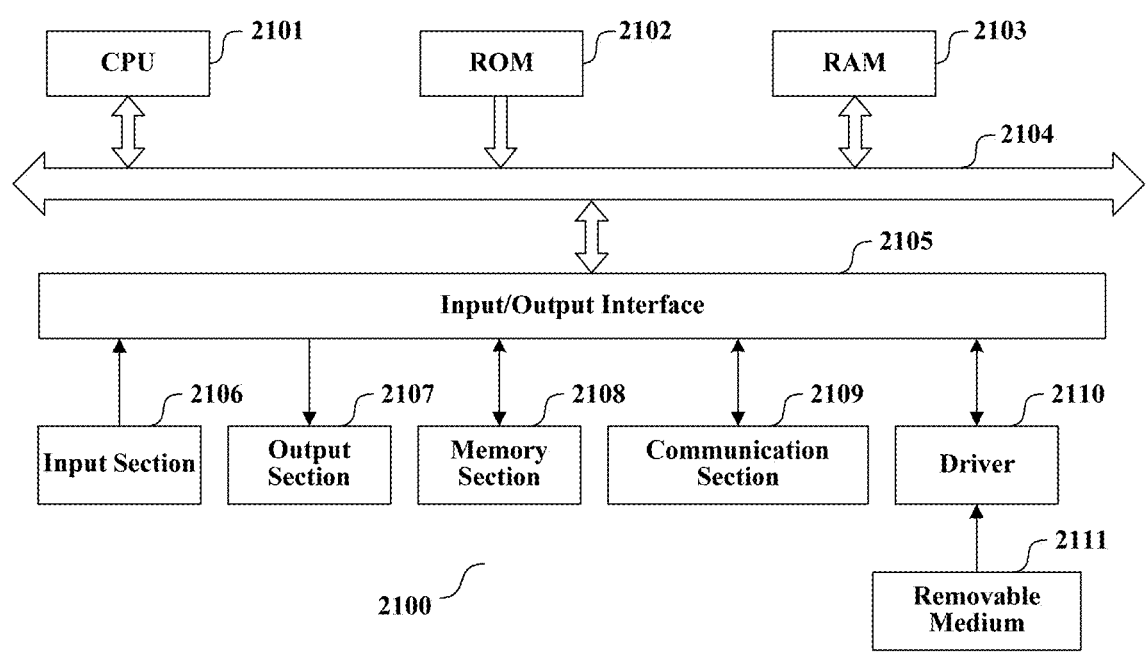
FIG. 21 is a block diagram of an exemplary block diagram illustrating the structure of a general purpose personal computer capable of realizing the method and/or device and/or system according to the embodiments of the present disclosure.

In FIG. 21, a central processing unit (CPU) 2101 executes various processing according to a program stored in a read-only memory (ROM) 2102 or a program loaded to a random access memory (RAM) 2103 from a memory section 2108. The data needed for the various processing of the CPU 2101 may be stored in the RAM 2103 as needed. The CPU 2101, the ROM 2102 and the RAM 2103 are linked with each other via a bus 2104. An input/output interface 2105 is also linked to the bus 2104.

The following components are linked to the input/output interface 2105: an input section 2106 (including keyboard, mouse and the like), an output section 2107 (including displays such as a cathode ray tube (CRT), a liquid crystal display (LCD), a loudspeaker and the like), a memory section 2108 (including hard disc and the like), and a communication section 2109 (including a network interface card such as a LAN card, modem and the like). The communication section 2109 performs communication processing via a network such as the Internet. A driver 2110 may also be linked to the input/output interface 2105, if needed. If needed, a removable medium 2111, for example, a magnetic disc, an optical disc, a magnetic optical disc, a semiconductor memory and the like, may be installed in the driver 2110, so that the computer program read therefrom is installed in the memory section 2108 as appropriate.

In the case where the foregoing series of processing is achieved through software, programs forming the software are installed from a network such as the Internet or a memory medium such as the removable medium 2111.

It should be appreciated by those skilled in the art that the memory medium is not limited to the removable medium 2111 shown in FIG. 21, which has program stored therein and is distributed separately from the apparatus so as to provide the programs to users. The removable medium 2111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2102 and the memory section 2108 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . ." in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications by a first mobile communication device, comprising:
   processing circuitry, configured to:
      determine, based on a channel statistical characteristic of a sidelink channel between the first mobile communication device and a second mobile communication device in an Internet of Vehicles, whether a communication path between the first mobile communication device and the second mobile communication device is a Line of Sight path or a Not Line of Sight path; and
      based on the communication path being the Line of Sight path, use information obtained through the Line of Sight path in cooperative location for the first mobile communication device and the second mobile communication device,
   wherein the processing circuitry is further configured to:
      determine the channel statistical characteristic of the sidelink channel between the first mobile communication device and the second mobile communication device based on a reference signal received at the first mobile communication device from the second mobile communication device,
      wherein the reference signal comprises a pilot signal or a training sequence that is transmitted periodically, or that is transmitted based on a predetermined condition;
      perform channel estimation based on the reference signal;
      determine the channel statistical characteristic based on a result of the channel estimation,
      wherein the channel statistical characteristic comprises one of a Ricean K-factor, a Kurtosis factor or a space time frequency channel correlation function;
      acquire, from a base station or a road side unit, a reference value of the channel statistical characteristic; and
      compare the determined channel statistical characteristic to the reference value to determine whether the communication path is the Line of Sight path or the Not Line of Sight path.

2. The electronic apparatus according to claim 1, wherein the processing circuitry is configured to acquire the reference value via a downlink between the base station and the first mobile communication device, or acquire the reference value via a sidelink channel between the road side unit and the first mobile communication device.

3. The electronic apparatus according to claim 2, wherein in a case that the processing circuitry is configured to acquire the reference value via the downlink between the base station and the first mobile communication device, information of the reference value is comprised in one of basic configuration information, minimum system information, other system information, or data information.

4. The electronic apparatus according to claim 2, wherein in a case that the processing circuitry is configured to acquire the reference value via the downlink between the base station and the first mobile communication device, the processing circuitry is configured to acquire the reference value via a physical broadcast channel or a physical downlink shared channel.

5. The electronic apparatus according to claim 4, wherein the reference value is comprised in a digital map, and is an attribute of each node in the digital map.

6. The electronic apparatus according to claim 2, wherein in a case that the processing circuitry is configured to acquire the reference value via the sidelink channel between the road side unit and the first mobile communication device, information of the reference value is comprised in one of basic configuration information, sidelink control information, or data information.

7. The electronic apparatus according to claim 2, wherein in a case that the processing circuitry is configured to acquire the reference value via the sidelink channel between the road side unit and the first mobile communication device, the processing circuitry is configured to acquire the reference value via a physical sidelink broadcast channel or a physical sidelink shared channel.

8. The electronic apparatus according to claim 1, wherein the processing circuitry is further configured to use the information obtained through the Line of Sight path to perform the cooperative location in a manner of Bayesian estimation or non-Bayesian estimation.

9. The electronic apparatus according to claim 8, wherein in the manner of the Bayesian estimation, in a case that that the Line of Sight path exists between the first mobile communication device and the second mobile communication device, the processing circuitry is further configured to;
   determine a location of the first mobile communication device based at least on a distance between the first mobile communication device and the second mobile communication device and information transmitted from the second mobile communication device to the first mobile communication device; or
   provide a central processing device with information of a distance between the first mobile communication device and the second mobile communication device, so that the central processing device determines locations of all communication devices in a centralized manner.

10. A method for wireless communications performed by first mobile communication device, the method comprising:
   determining, based on a channel statistical characteristic of a sidelink channel between the first mobile communication device and a second mobile communication device in an Internet of Vehicles, whether a communication path between the first mobile communication device and the second mobile communication device is a Line of Sight path or a Not Line of Sight path; and
   based on the communication path being the Line of Sight path, using information obtained through the Line of Sight path in cooperative location for the first mobile communication device and the second mobile communication device,
   wherein the method further comprises:
      determining the channel statistical characteristic of the sidelink channel between the first mobile communication device and the second mobile communication device based on a reference signal received at the first mobile communication device from the second mobile communication device, wherein the reference signal comprises a pilot signal or a training sequence that is transmitted periodically, or that is transmitted based on a predetermined condition;

performing channel estimation based on the reference signal;

determining the channel statistical characteristic based on a result of the channel estimation, wherein the channel statistical characteristic comprises one of a Ricean K-factor, a Kurtosis factor or a space time frequency channel correlation function;

acquiring, from a base station or a road side unit, a reference value of the channel statistical characteristic; and comparing the determined channel statistical characteristic to the reference value to determine whether the communication path is the Line of Sight path or the Not Line of Sight path.

11. A non-transitory computer product containing instructions to perform a method for wireless communications, the method comprising:

determining, based on a channel statistical characteristic of a sidelink channel between the first mobile communication device and a second mobile communication device in an Internet of Vehicles, whether a communication path between the first mobile communication device and the second mobile communication device is a Line of Sight path or a Not Line of Sight path; and based on the communication path being the Line of Sight path, using information obtained through the Line of Sight path in cooperative location for the first mobile communication device and the second mobile communication device, wherein the method further comprises:

determining the channel statistical characteristic of the sidelink channel between the first mobile communication device and the second mobile communication device based on a reference signal received at the first mobile communication device from the second mobile communication device, wherein the reference signal comprises a pilot signal or a training sequence that is transmitted periodically, or that is transmitted based on a predetermined condition;

performing channel estimation based on the reference signal;

determining the channel statistical characteristic based on a result of the channel estimation, wherein the channel statistical characteristic comprises one of a Ricean K-factor, a Kurtosis factor or a space time frequency channel correlation function;

acquiring, from a base station or a road side unit, a reference value of the channel statistical characteristic; and comparing the determined channel statistical characteristic to the reference value to determine whether the communication path is the Line of Sight path or the Not Line of Sight path.

* * * * *